(12) United States Patent
Lau et al.

(10) Patent No.: US 10,757,169 B2
(45) Date of Patent: Aug. 25, 2020

(54) SELECTIVE MASTER DATA TRANSPORT

(71) Applicant: Model N, Inc., Redwood City, CA (US)

(72) Inventors: Wilson Lau, Kowloon (HK); Rinku A. Daxini, Fremont, CA (US); Kavita Waldia, San Jose, CA (US); Victor Yemelianenko, Odessa (UA)

(73) Assignee: Model N, Inc., San Mateo, CA (US)

( * ) Notice: Subject to any disclaimer, the term of this patent is extended or adjusted under 35 U.S.C. 154(b) by 22 days.

(21) Appl. No.: 15/990,472

(22) Filed: May 25, 2018

(65) Prior Publication Data
US 2019/0364092 A1  Nov. 28, 2019

(51) Int. Cl.
*H04L 29/08* (2006.01)
*G06F 16/23* (2019.01)

(52) U.S. Cl.
CPC .......... *H04L 67/06* (2013.01); *G06F 16/2379* (2019.01)

(58) Field of Classification Search
CPC ............................ H04L 67/06; G06F 16/2379
See application file for complete search history.

(56) References Cited

U.S. PATENT DOCUMENTS

| | | |
|---|---|---|
| 5,515,269 A | 5/1996 | Willis |
| 5,515,524 A | 5/1996 | Lynch |
| 5,576,965 A | 11/1996 | Akasaka |
| 5,617,514 A | 4/1997 | Dolby |
| 5,630,025 A | 5/1997 | Dolby |
| 5,708,798 A | 1/1998 | Lynch |
| 5,764,615 A * | 6/1998 | Ware ............... G11B 15/6835 360/92.1 |
| 6,002,854 A | 12/1999 | Lynch |
| 6,035,305 A | 3/2000 | Strevey |
| 6,115,547 A | 9/2000 | Ghatate |
| 6,188,977 B1 | 2/2001 | Hirota |
| 6,233,493 B1 | 5/2001 | Cherneff |
| 6,359,855 B1 * | 3/2002 | McPherson ......... G11B 17/056 720/652 |
| 6,430,730 B1 | 8/2002 | Ghatate |
| 6,560,060 B1 * | 5/2003 | Kappel ............. G11B 15/6835 360/92.1 |
| 6,854,524 B1 | 2/2005 | Williams |

(Continued)

OTHER PUBLICATIONS

International Search Report and Written Opinion, PCT/US2013/077214, dated Apr. 28, 2014 (15 pages).

(Continued)

*Primary Examiner* — El Hadji M Sall
(74) *Attorney, Agent, or Firm* — Patent Law Works LLP

(57) ABSTRACT

A method for updating a non-current data model using a current data model. The update exports a first data set which includes a file with a model object for the current data model, another with option group ("OG") objects, another with rule objects, and another with junction objects that relate a rule to an OG. The update exports a second data set that includes a file with model-to-OG junction objects, and a file with model-to-rule junction objects. The update transports the first, and second data sets from a first data repository to a second data repository. The update imports, to the non-current data model, the first, and second data sets. The update recreates, in the non-current data model, the model-to-option-group junctions and the model-to-rule junctions.

20 Claims, 16 Drawing Sheets

(56) References Cited

U.S. PATENT DOCUMENTS

| | | |
|---|---|---|
| 6,856,980 B2 | 2/2005 | Feldman |
| 6,915,253 B1 | 7/2005 | Chapman |
| 7,043,407 B2 | 5/2006 | Lynch |
| 7,200,583 B1 | 4/2007 | Shah |
| 7,340,409 B1 | 3/2008 | Ulwick |
| 7,433,748 B2 | 10/2008 | Selway |
| 7,483,869 B2 | 1/2009 | Kumar |
| 7,949,738 B2 | 5/2011 | Kumar |
| 7,970,724 B1 | 6/2011 | Hauser |
| 8,160,990 B2 | 4/2012 | Varmaraja |
| 8,682,773 B1 | 3/2014 | Murphy |
| 8,943,003 B2 | 1/2015 | Ardoint |
| 2001/0025264 A1 | 9/2001 | Deaddio |
| 2002/0035463 A1 | 3/2002 | Lynch |
| 2002/0072956 A1 | 6/2002 | Willems |
| 2002/0111891 A1 | 8/2002 | Hoffman |
| 2002/0120917 A1 | 8/2002 | Abrari |
| 2002/0154114 A1 | 10/2002 | Christensen |
| 2002/0169658 A1 | 11/2002 | Adler |
| 2002/0198856 A1 | 12/2002 | Feldman |
| 2003/0018486 A1 | 1/2003 | Feldman |
| 2003/0033240 A1 | 2/2003 | Balson |
| 2003/0212584 A1 | 11/2003 | Flores |
| 2004/0078796 A1 | 4/2004 | Utsumi |
| 2004/0122747 A1 | 6/2004 | Jimenez |
| 2004/0128117 A1 | 7/2004 | Crandall |
| 2004/0181441 A1 | 9/2004 | Fung |
| 2005/0006456 A1* | 1/2005 | White .................... G06Q 10/08 235/376 |
| 2005/0010919 A1* | 1/2005 | Ramanathan ............. G06F 8/61 717/174 |
| 2005/0090911 A1 | 4/2005 | Ingargiola |
| 2005/0096950 A1 | 5/2005 | Caplan |
| 2005/0182693 A1 | 8/2005 | Alivandi |
| 2005/0222996 A1 | 10/2005 | Yalamanchi |
| 2005/0263594 A1 | 12/2005 | Onischu |
| 2006/0069892 A1 | 3/2006 | Nakanishi |
| 2006/0100829 A1 | 5/2006 | Lynch |
| 2006/0167577 A1 | 7/2006 | Clark |
| 2006/0168573 A1 | 7/2006 | Clark |
| 2006/0282458 A1 | 12/2006 | Tsyganskiy |
| 2007/0094060 A1 | 4/2007 | Apps |
| 2007/0213968 A1 | 9/2007 | Nakagawa |
| 2008/0059273 A1 | 3/2008 | Miller |
| 2008/0163101 A1 | 7/2008 | Rimas-Ribikauskas |
| 2008/0216148 A1 | 9/2008 | Bienek |
| 2009/0006301 A1 | 1/2009 | Goetsch |
| 2009/0248597 A1 | 10/2009 | Fickie |
| 2009/0287617 A1 | 11/2009 | Schmidt |
| 2010/0121795 A1 | 5/2010 | Colena |
| 2010/0161360 A1 | 6/2010 | Clement |
| 2010/0262443 A1 | 10/2010 | D'Albis |
| 2011/0087689 A1 | 4/2011 | Ziegler |
| 2011/0173050 A1 | 7/2011 | Heyns |
| 2011/0191263 A1 | 8/2011 | Torre |
| 2011/0301926 A1 | 12/2011 | Chussil |
| 2012/0005144 A1 | 1/2012 | Cutler |
| 2012/0166459 A1 | 6/2012 | Ritter |
| 2012/0198368 A1 | 8/2012 | Bornheimer |
| 2013/0110473 A1 | 5/2013 | Cantu |
| 2014/0032482 A1 | 1/2014 | Dulaney |
| 2014/0096041 A1 | 4/2014 | Gowen |
| 2018/0284999 A1* | 10/2018 | Aslam .................... G06F 3/0647 |

OTHER PUBLICATIONS salesforce.com "Set up and Maintain Your Salesforce Organization," Feb. 18, 2016 (840 pages).

* cited by examiner

Auth. Provider

«Back to list: AuthProviders

Auth. Provider Detail  602

[Edit] [Delete] [Clone]

| | |
|---|---|
| Auth. Provider ID | 10SOj0000000bIL0 |
| Provider Type | Salesforce |
| Name | TargetOrg |
| URL Suffix | TargetOrg |
| Consumer Key | 3MVG9sG9Z3Q1RIbfDHX9hpZV7RdPG2.ULueDjPMc_YOnbTQj292OPSXYy625yjoFJpY4rdLu8R.pFZFy7DnGH |
| 604 — Consumer Secret | Click to reveal |
| Authorize Endpoint URL | https://login.salesforce.com/services/oauth2/authorize |
| Token Endpoint URL | https://login.salesforce.com/services/oauth2/token |
| Default Scopes | refresh_token full |
| Custom Error URL | |
| Custom Logout URL | |
| Registration Handler | |
| Execute Registration As | |
| Portal | |
| Icon URL | |

Salesforce Configuration

| | |
|---|---|
| Test-Only Initialization URL | https://login.salesforce.com/services/auth/test/00Dj0000001rN4OEAU/TargetOrg |
| Existing User Linking URL | https://login.salesforce.com/services/auth/link/00Dj0000001rN4OEAU/TargetOrg |
| OAuth-Only Initialization URL | https://login.salesforce.com/services/auth/oauth/00Dj0000001rN4OEAU/TargetOrg |
| 606 — Callback URL | https://login.salesforce.com/services/authcallback/00Dj0000001rN4OEAU/TargetOrg |

[Edit] [Delete] [Clone]

Figure 6

| Home | Accounts | Opportunities | MN Quotes | MN Admin | Proposal Templates | Product Eligibility | SAP Sales Area and Account Junction Approval Process Instances | ✚ |

Products

702 ── Catalog
  └ Products
    Pricing
    Configurations
706 ── Solutions
    Attributes
    Quote Rules
    Admin Options

[Filter]

[New Product]

|< < > >|  1-30 of 243  [Refresh]  Page 1 of 9

| Action | ID | Name | Status | Billing Freq. | Sold By Itself | Type | Configurable | Model |
|---|---|---|---|---|---|---|---|---|
| Edit Basic\|Delete\|Transport | RCPQ_15061_product | RCPQ_15061_product | Active | One Time | ☑ | Product | ☑ | RCPQ_15061_model |
| Edit Basic\|Delete\|Transport | testSapProduct | testSapProduct | Inactive | One Time | ☑ | Product | ☐ | |
| Edit Basic\|Delete\|Transport | ServiceProduct | ServiceProduct | Active | One Time | ☑ | Product | ☐ | ServiceModel |
| Edit Basic\|Delete\|Transport | F_30003307 | F_30003307 | Active | One Time | ☑ | Product | ☐ | |
| Edit Basic\|Delete\|Transport | F_30003303 | F_30003303 | Active | One Time | ☑ | Product | ☐ | |
| Edit Basic\|Delete\|Transport | F_30003308 | F_30003308 | Inactive | One Time | ☑ | Product | ☑ | Model for BIKE_ACCE |
| Edit Basic\|Delete\|Transport | BIKE_ACCESSORY | BIKE_ACCESSORY | Active | One Time | ☑ | Product | ☐ | |
| Edit Basic\|Delete\|Transport | F_30003306 | F_30003306 | Active | One Time | ☑ | Product | ☐ | |
| Edit Basic\|Delete\|Transport | MacbookPro | Macbook Pro | Active | One Time | ☑ | Product | ☐ | |
| Edit Basic\|Delete\|Transport | CENT_CITY_ALU | CENT_CITY_ALU | Active | One Time | ☑ | Product | ☑ | Model for CENT_CITY_ |
| Edit Basic\|Delete\|Transport | IBSalesProductNonConf1 | IB Sales Product Non-Conf1 | Active | One Time | ☑ | Product | ☐ | |
| Edit Basic\|Delete\|Transport | urlProduct | urlProduct | Active | One Time | ☑ | Product | ☐ | |

☐ Data Transport of Knee Solution

RELATED    DETAILS

☐ Notes & Attachments (6+)

1102

| 📎 Comp_Knee_Solution_9.json<br>Aug 28, 2017 · Attachment | 📎 EXP_REVVY_-_ConfigEngineOGUISectionJunction_O...<br>Aug 28, 2017 · Attachment | 📎 EXP_REVVY_-_ConfigE<br>Aug 28, 2017 · Attachm |
|---|---|---|
| 📎 EXP_REVVY_-_ConfigEngineUISection_001.json<br>Aug 28, 2017 · Attachment | 📎 EXP_REVVY_-_Expression_001.json<br>Aug 28, 2017 · Attachment | 📎 EXP_REVVY_-_ModelC<br>Aug 28, 2017 · Attachm |

View All

☐ Data Transport Errors (6+)

1104

| ID | DATE | TYPE | MESSAGE |
|---|---|---|---|
| 00000394 | 8/28/2017 12:21 PM | Error | File Import Processing |
| 00000391 | 8/28/2017 12:21 PM | Debug | Processing Attachment |
| 00000392 | 8/28/2017 12:21 PM | Debug | Completed import plug |

Figure 11

Data Transports > Data Transport of Knee Solution
Notes & Attachments
15 items · Sorted by Last Modified · Updated a few seconds ago

| | TITLE | ∨ OWNER |
|---|---|---|
| 1 | Comp_Knee Solution_9.json —1202 | System Admin |
| 2 | EXP_REVVY__ConfigEngineOGUISectionJunction_001.json | System Admin |
| 3 | EXP_REVVY__ConfigEngineUILayout_001.json | System Admin |
| 4 | EXP_REVVY__ConfigEngineUISection_001.json | System Admin |
| 5 | EXP_REVVY__Expression_001.json | System Admin |
| 6 | EXP_REVVY__ModelOptionGroupJunction_001.json | System Admin |
| 7 | EXP_REVVY__ModelRuleJunction_001.json | System Admin |
| 8 | EXP_REVVY__Model_001.json | System Admin |
| 9 | EXP_REVVY__OptionGroupAttribute_001.json | System Admin |
| 10 | EXP_REVVY__OptionGroup_001.json | System Admin |
| 11 | EXP_REVVY Option_001.json | System Admin |

Figure 12

| | ID | ∨DATE ↓ | ∨T... | ∨MESSAGE |
|---|---|---|---|---|
| 1 | 00000394 | 8/28/2017 12:21 PM | Error | File Import Processing Error: REVVY__MnConfigEngineRuleDataCell__c Foreign key external ID: 9e66ce8b-fb06-4640-80cb-b641f454877c not found for field REVVY__Id__c in entity REVVY__ |
| 2 | 00000391 | 8/28/2017 12:21 PM | Debug | Processing attachment file. Attachment:{Id=00P140000019SZ4EAM, Name=EXP_REVVY__ConfigEngineUISection_001.json, Body=Blob[5580]} |
| 3 | 00000392 | 8/28/2017 12:21 PM | Debug | Completed import plugin for object REVVY__MnConfigEngineUISection__c with import sequence 3.0 |
| 4 | 00000393 | 8/28/2017 12:21 PM | Debug | Processing attachment file. Attachment:{Id=00P140000019SvVEAU, Name=EXP_REVVY__RuleDataCell_001.json, Body=Blob[96111]} |
| 5 | 00000385 | 8/28/2017 12:21 PM | Debug | Completed import plugin for object REVVY__MnConfigEngineRuleOptionGroupJunction__c with import sequence 2.0 |
| 6 | 00000386 | 8/28/2017 12:21 PM | Debug | Completed imports for all objects with with sequence number 2.0 scheduling next batch of jobs |
| 7 | 00000387 | 8/28/2017 12:21 PM | Debug | Adding job for obj type REVVY__MnCatalogNodeEdge__c for transport a2f400000h7dhAAA. Query: SELECT Id, Name, Body FROM Attachment WHERE ParentId IN :queryIdsArg AND Desc |
| 8 | 00000388 | 8/28/2017 12:21 PM | Debug | Adding job for obj type REVVY__MnConfigEngineUISection__c for transport a2f400000h7dhAAA. Query: SELECT Id, Name, Body FROM Attachment WHERE ParentId IN :queryIdsArg AND I |
| 9 | 00000389 | 8/28/2017 12:21 PM | Debug | Adding job for obj type REVVY__MnConfigEngineRuleDataCell__c for transport a2f400000h7dhAAA. Query: SELECT Id, Name, Body FROM Attachment WHERE ParentId IN :queryIdsArg A |
| 10 | 00000390 | 8/28/2017 12:21 PM | Debug | Completed import plugin for object REVVY__MnCatalogNodeEdge__c with import sequence 3.0 |
| 11 | 00000382 | 8/28/2017 12:21 PM | Debug | Processing attachment file. Attachment:{Id=00P140000019SvSEAU, Name=EXP_REVVY__OptionGroupAttribute_001.json, Body=Blob[7491]} |
| 12 | 00000383 | 8/28/2017 12:21 PM | Debug | Completed import plugin for object REVVY__MnOptionGroupAttributeJunction__c with import sequence 2.0 |
| 13 | 00000384 | 8/28/2017 12:21 PM | Debug | Processing attachment file. Attachment:{Id=00P140000019SvXEAU, Name=EXP_REVVY__RuleOptionGroupJunction_001.json, Body=Blob[13728]} |
| 14 | 00000378 | 8/28/2017 12:21 PM | Debug | Completed import plugin for object REVVY__MnConfigEngineModelRuleJunction__c with import sequence 2.0 |
| 15 | 00000379 | 8/28/2017 12:21 PM | Debug | Processing attachment file. Attachment:{Id=00P140000019SvUEAU, Name=EXP_REVVY__Option_001.json, Body=Blob[41585]} |
| 16 | 00000380 | 8/28/2017 12:21 PM | Debug | Completed import plugin for object REVVY__MnConfigEngineOption__c with import sequence 2.0 |
| 17 | 00000381 | 8/28/2017 12:21 PM | Debug | Deleting unused options in Option Groups for current model |

Figure 13

SELECTIVE MASTER DATA TRANSPORT

TECHNICAL FIELD

The present disclosure relates to selective transportation of data models.

BACKGROUND

Computer processing power, connectivity, and data storage capacity are continually increasing. Yet as more and data and processes can be effectively modeled in contemporary networked computer systems, the boundaries of storage and connectivity are continually pressed. Keeping large models up-to-date and available in physical or network locations that provide for acceptable response time can be a problem for any organization, particularly those with limited resources.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, which includes exporting a first data set including a model framework of a current data model. The first data set includes a model object file having a model object for the current data model, an option group ("OG") object file having one or more OG objects, a rule object file having one or more rule objects, and a rule-to-OG junction object file having one or more rule-to-OG junction objects that relate the one or more rule objects to the one or more OG objects. The computer-implemented method also includes exporting, from the current data model, a second data set. The second data set includes a model-to-OG junction object file having one or more model-to-OG junction objects, and a model-to-rule junction object file having one or more model-to-rule junction objects. The computer-implemented method also includes transporting the first data set and the second data set from a second data repository to a first data repository. The computer-implemented method also includes importing, to a non-current data model, the first data set to update the model object, the one or more OG objects, the one or more rule objects, and the one or more rule-to-OG junction objects to match. The computer-implemented method also includes importing, to the non-current data model, the second data set to re-create, in the non-current data model, the one or more model-to-OG junction objects relating the one or more OG objects to the model object and the one or more model-to-rule junction relating the one or more rule objects to the model object. Other embodiments of this aspect include corresponding computer systems, apparatus, and computer programs recorded on one or more computer storage devices, each configured to perform the actions of the methods.

Implementations may include one or more of the following features. The computer-implemented method further including: locking for exclusive write access, before the importing operation, the non-current data model; and unlocking the non-current data model after the importing operation is completed. The computer-implemented method where the importing is performed in a data set order, the data set order being importing the object files of the first data set, in any order, followed by importing the object files of the second data set, in any order. The computer-implemented method further including: exporting, from the current data model, a third data set, the second data set including. The computer-implemented method may also include an OG property object file having one or more OG property objects. The computer-implemented method may also include an OG-to-OG-property junction object file having one or more OG-to-OG-property junction objects that relate an OG to an OG-property, where the importing is performed in an object file order, the object file order being importing the object files of the first data set in the order listed in the exporting operation, followed by importing the object files of the third data set in the order listed in the exporting operation, followed by importing the object files of the second data set in the order listed in the exporting operation. The computer-implemented method where the one or more OG property objects include one or more of OG option objects and OG attribute objects. The computer-implemented method further including: detecting a component which failed to transport, and retrying the transport of the component which failed to transport. The computer-implemented method further including: exporting, to the second data repository, before the transporting operation is complete, a fourth data set including. The computer-implemented method may also include an expression object file having one or more expression objects. The computer-implemented method may also include an expression condition object file having one or more expression condition objects. The computer-implemented method may also include an expression reference object file having one or more expression reference objects. The computer-implemented method may also include a rule data cell object file having one or more rule data cell objects. The computer-implemented method may also include transporting the fourth data set from the second data repository to the first data repository. The computer-implemented method may also include importing the fourth data set into the non-current data model. Implementations of the described techniques may include hardware, a method or process, or computer software on a computer-accessible medium.

BRIEF DESCRIPTION OF THE DRAWINGS

This disclosure is illustrated by way of example, and not by way of limitation in the figures of the accompanying drawings in which like reference numerals are used to refer to similar elements.

FIG. 6 is a graphical representation of an example authorization provider detail page.

FIG. 7 is a graphical representation of an example administrator page GUI for products.

FIG. 11 is a graphical representation of an example data transport related items page GUI.

FIG. 12 is a graphical representation of an example data transport file listing page GUI.

FIG. 13 is a graphical representation of an example data transport job log message page GUI.

DETAILED DESCRIPTION

Selective master data transport allows administrators or other authorized users to export and import models, products and solutions from one data repository to another, such as one Salesforce organization ("org") to another. An org is a collection of data and/or objects associated with an entity. This enables customers to manage the changes in products through their lifecycle by easily moving the changes across repositories or orgs without having to redo manually the changes each time. For example, when a model is transported from one org to another, it can be re-transported as changes are made to the model in one org. Products and solutions may also be transported from one org to another, and then re-transported as changes are made to a product, solution, or both, in one org. Both source and target orgs may have their own custom domains set in the system.

The selective master data transport system and methodology described herein significantly reduces the effort and complexity for users (e.g., administrators) when maintaining new products or making product changes. The technology provides the ability to manage product changes effectively which supports enterprise-grade applications by enhancing the ability to use and update models, products, and solutions for users.

Figure 1:
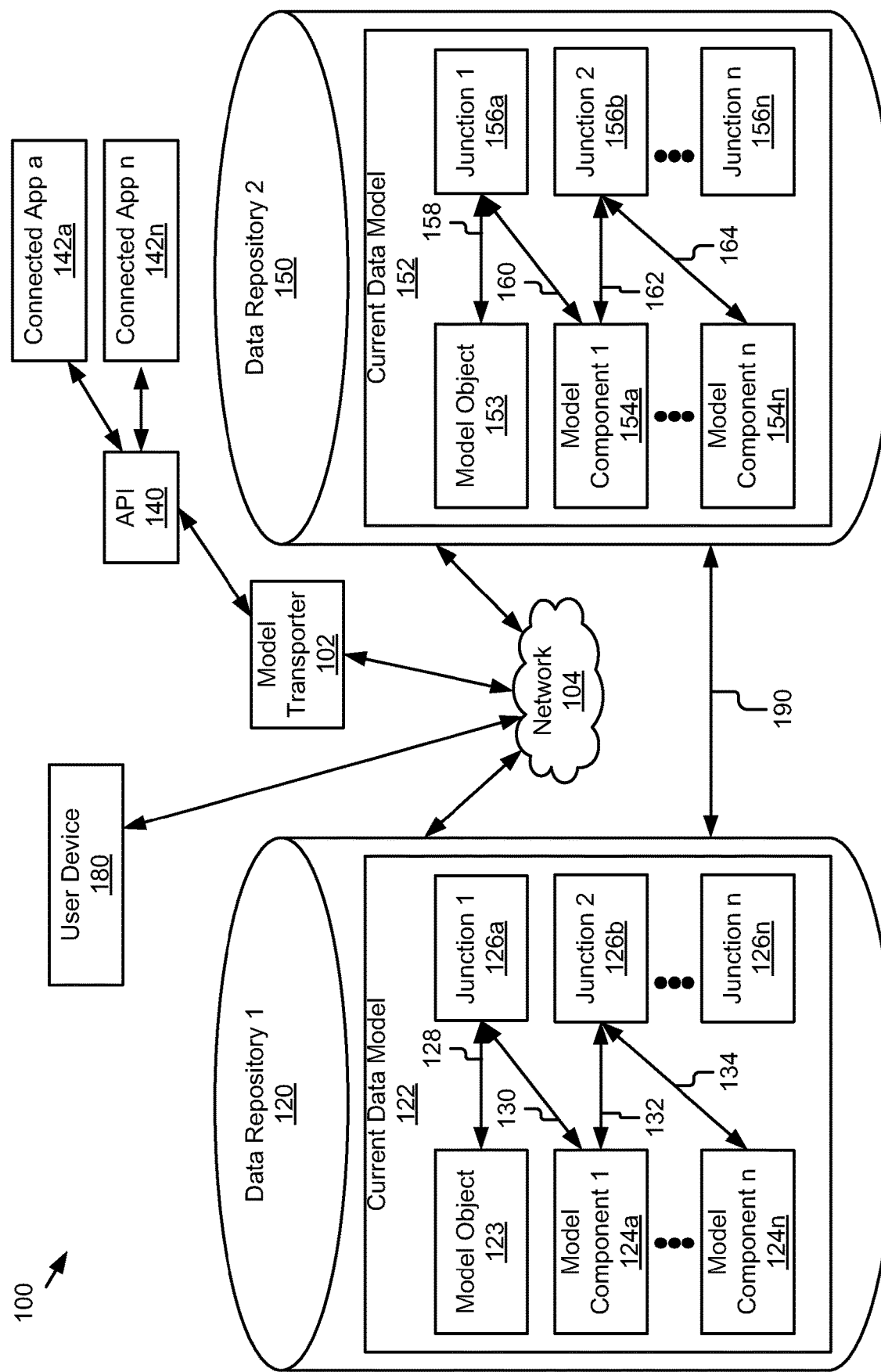
FIG. 1 is a block diagram illustrating an example model transport system.

By way of example, the model transporter, such as the model transporter depicted in FIG. 1, model transporter 102, moves a model, and it's components, from a source org to a destination org. The transported components include objects comprising the model, such as a model object, option group objects, option objects, rule objects, user entered values ("UEV") and other attributes. These transported components are described in depth in U.S. patent application Ser. No. 14/069,362, entitled "Simplified Product Configuration Using Table-Based Rules, Rule Conflict Resolution Through Voting, and Efficient Model Compilation," filed Oct. 31, 2013, which references U.S. Provisional Application No. 61/740,816, entitled "Nimbus Configurator Architecture," filed on Dec. 21, 2012. The entire contents of each of these references are incorporated herein by reference.

In some embodiments, a model component may include a compiled model (if not already published in the source org). When a model is transported for the first time, the model transporter 102 recreates the model in the destination org. Then, models can be re-transported to the destination org when the source model is changed. During re-transport, option groups are added or removed from the model, options are added or removed from the option groups, option group attributes are updated, and rules are added or removed from the model.

Models can be moved with or without versioning enabled. When versioning is enabled in both the source and destination orgs, model version numbers may be maintained when transported. Version numbers can be skipped during transport. For example, version 3 of a model could be transported without previously transporting version 1 or 2.

When a model is re-transported, the system can check whether the model is open for edit in the destination org. If it is editable, the model, option groups, and rules may be updated. The junctions between the model and option groups may be recreated, as well as the junctions between the model and the rules. The system may for updating option identifiers, rule identifiers, and option group identifiers for efficiency, in some embodiments.

Selective data transport also allows administrators to transport products and solutions across orgs. In some implementations, before transporting a product or solution catalogs and categories should be already present in the destination org. Also, attributes should be already present in the attributes list in the destination org.

When a product or solution is transported for the first time, the product or solution record details are transported, the images are transported, and the model linked to the product or solution is transported. Also, lifecycle information and attribute values for products are transported. In some embodiments, if attributes are not found for the product, e.g., the product is not assigned to the right category already, the system can ignore the attributes and log an error describing such. If attributes are found for the product, the system may assign or recreate the product-to-attribute junction with the new values.

When a product or solution is re-transported, the transported information may be updated. In some embodiments, all of the transported information may be updated except for the lifecycle information. Lifecycle information is not updated because a product lifecycle can progress independently in the two orgs, although other variants are also applicable where some or all of the lifecycle information may be replicated.

In some implementations, multiple target (or "destination") orgs may be specified for transport from a source org. In some implementations, the import can be started manually at the target org, and in some implementations, the import can start automatically at the target org, e.g., based on a trigger. A triggering event may be receiving notification that all necessary files have completed transport. Another triggering event may be that enough files have completed transport in order to begin the import process (and the rest may complete transport as the import is proceeding). Other triggers are contemplated, including calculating a trigger considering factors such as expected transport speed and expected import speed to optimize the completion time based on both factors—or based on other relevant factors.

When transporting, files may be exported and imported as structured data files such as XML or JSON, encoded files such as zip or files containing Base64 formatted information, encrypted using encryption and key-exchange algorithms, etc.

To set up a connected app on a target org, using the technology described herein (e.g., see system 100 in FIG. 1), in some implementations, the user may authenticate, bring up an interface for a new connected app (an application integrated with the system 100 through an application programming interface "API"), and enter the relevant information for the connected app. Relevant information for the connected app, in some implementations, might include an app name, API name, contact information (such as an email address for a system administrator), authorization system settings (e.g., OAuth, and OAuth scope settings), a callback URL for use by the source org. After configuring the connected app, the user may save the app profile by selecting a save option in the user interface and create a new integration user in the target org for use by the source org in creating, updating, or deleting records as part of the data transport process.

In some implementations, an org may have fields defining its name, ID, type, namespace prefix, named credential, etc. To set up an authorized provider on the source org, in some implementations, an administrator may log in to the source org, and using a provided interace, may create and save a new authorized provider, defining the values of properties for the authorized provider such as the name of the target org, credentials for the target org (e.g., a consumer key and a consumer secret) that are generated by the target org, and other settings as necessary, such as the type of refresh desired by the configured transport and a callback URL for the target org, using the displayed fields of the interface.

In some implementations, named credentials are created on the source org by creating a new named credential, and entering the relevant information in a corresponding interface. Such information could include the name and label of the target org, the URL of the target org, the type of named credential (e.g., Named Principal), the authentication protocol (e.g., "OAuth 2.0") along with the required parameters for the authentication protocol, and the authorized provider created above. In some implementations, further settings may be useful or necessary, such as the type of refresh desired, and authentication and communication settings.

In some implementations, the system 100 may run an authentication test when the information is entered and saved, to validate the settings and their functionality. The newly-created named credential may then be set in the source org as a data transport credential.

In some implementations, a named credential may be used to call a target org's bulk API calls from the source org to create a job, add a batch to the job, check the status of the job, check the status of the batch, get success or error status for element of the job, and close the job. A regularly-scheduled job may be set up for keeping an OAuth token for the named credential valid. Properties may be created to store the name of the credential used to connect to the target org, the target org's namespace prefix, and other settings such as debug information and logging.

Figure 15:
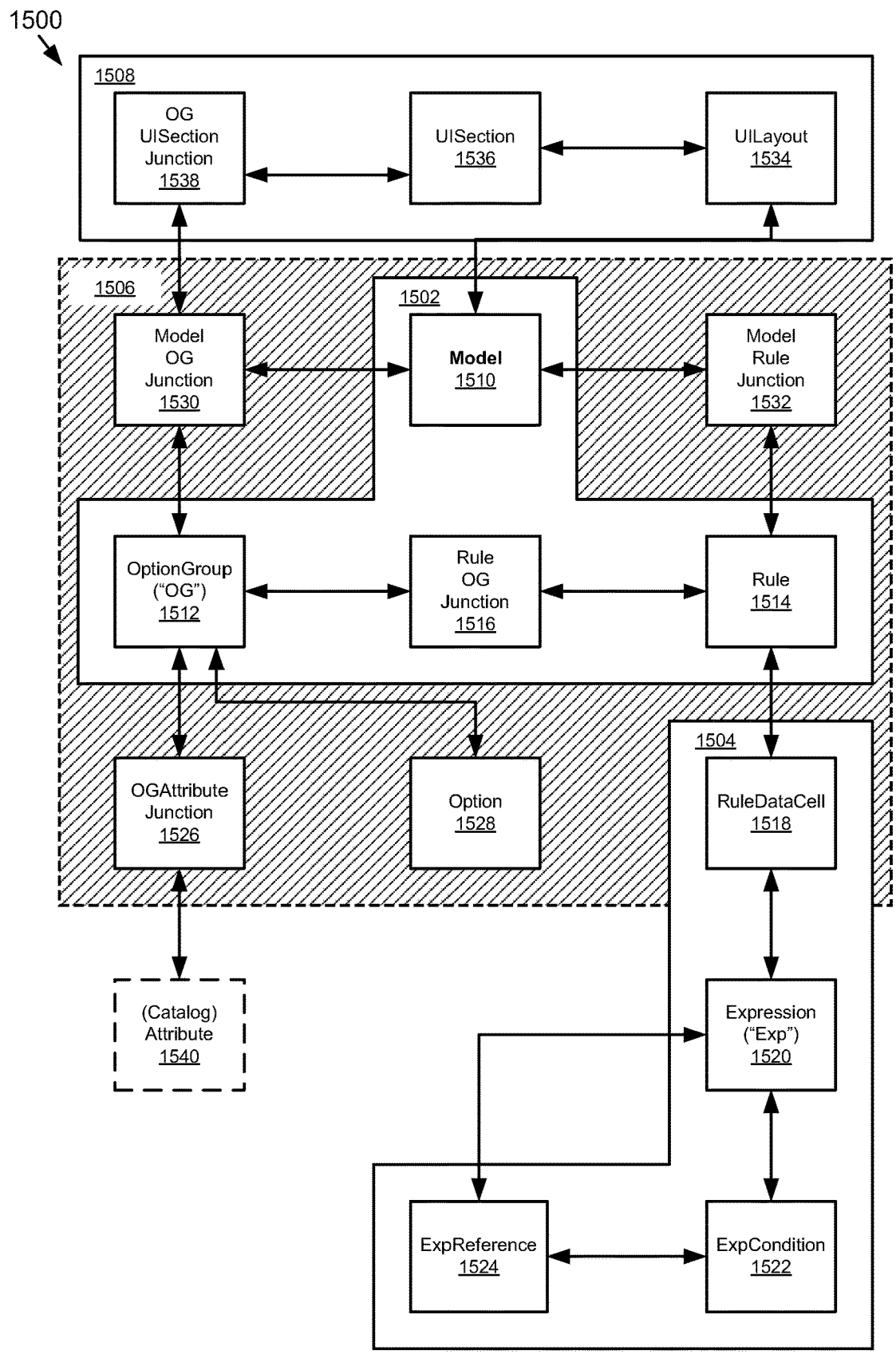
FIG. 15 is a class diagram of an example model and its related classes.

In some implementations, the model transporter 102 directs the exportation of relevant records from the source model for eventual import by the target org. The relevant records for export may be determined, in some implementations, by defining the scope using WHERE clauses from a SQL-like query. For example, for catalog nodes and attributes, related nodes and attributes may be identified with a "WHERE Id IN:queryIdsArg" clause. Likewise for model objects to find related model objects a "WHERE model IN:queryIdsArg" clause may be used. The queryIdsArg is built by adding all objects of a related class to a set and where the queryIdsArg is the set. In some implementations, objects may be added to the queryIdsArg set as they are changed or as objects with which they have a dependent relationship are changed. By way of example, FIG. 15 provides an example of the classes, in some implementations, and their relationships to each other.

In some implementations, system administrators may control which objects are selectable for transport. In some implementations, system administrators may specify the fields of an object to transport. In some implementations, administrators may select certain objects for transport, and all objects dependent on the selected objects are also selected for transport.

In some implementations, the exported files may be structured data files such as files having a JSON format, a convention is used for the file which includes the class name of the objects in the file in the file name. In some implementations, the objects in the file may be serialized using Base64 encoding.

In some implementations, a metadata file may be created for a transport operation including fields that specify parameters for the transport. For example, the metadata file, in some implementations, may include a batch size, an external id, an export sequence number, an import sequence number, an object name, a related object name, and a WHERE clause. The batch size may be used for creating export files from the objects. The WHERE clause is a query language clause that may be used by the data transport export to filter records to those that are relevant for the transport.

In some implementations, the collection of all exported files may be combined into a single file (such as a zip file) for bulk data transfer. Considerations should be taken into account based on considerations such as available heap memory, etc. In some cases, the zip file may need to be segmented into multiple zip files for the transfer.

The exported data from the source org, or at least a portion of it, may be imported at the target org in some implementations. In some implementations, a data transport record may be created by the export process. In some implementations, the exported configuration model, the model's related records, including, in some implementations, the compiled model (if the model was published, for example) may be attached to the import data transport record. These may be attached as separate files, in some implementations, with the object name as the name of the file, for example.

In some implementations, the order of import may be significant and may be influenced by object dependencies. In some implementations, a custom metadata file sets the order of import. The metadata file may include an import sequence number, object name, and a unique identifier, etc. In some implementations, multiple objects may have the same import sequence number. In that case, objects with the same import sequence number may be imported in any order, so long as all objects with a lower number were imported prior, and all objects with the same number are imported before any objects with a higher import sequence number. In some implementations, exporting objects with an import sequence number of "0" means not to import the object, even though there may be reasons to export it, such as exporting information about the object that may be helpful in the import of other objects.

In some implementations, the object import order for updating a model may be:

TABLE 1

A model object import order (by class of object).

| Import Sequence | Class of Object |
| --- | --- |
| 0 | CatalogNode |
| 0 | CatalogAttribute |
| 1 | Expression |
| 1 | Model |
| 1 | OptionGroup |
| 1 | Rule |
| 2 | UILayout |

TABLE 1-continued

A model object import order (by class of object).

| Import Sequence | Class of Object |
|---|---|
| 2 | ExpressionCondition |
| 2 | ExpressionRef |
| 2 | ModelOptionGroupJunction |
| 2 | ModelRuleJunction |
| 2 | Option |
| 2 | OptionGroupAttributeJunction |
| 2 | RuleOptionGroupJunction |
| 3 | UISection |
| 3 | RuleDataCell |
| 4 | OptionGroupUISectionJunction |

A plugin architecture may be used, in some implementations, where plugins are used to process the objects imported. In some implementations, logs are kept that log success, failures, anomalies, or other notable events. In some implementations, the import is performed in batches, with batch-management parameters used to manage the process and conform the process to any limits of the resources (computers, databases, files, networks, etc.) used in the import.

In some implementations, the system 100 may export a product or solution from a source org, transported, and imported at the destination org. As with the export, transport, and import pieces, the system 100 may generate files from the source org, transport those files to the destination org, and import them into the product or solution at the destination org. Additionally, the system 100 may export, transport, and import files for the configuration model associated with the product or solution (the process previously discussed).

In some implementations, the system 100 may determine the records of the product or solution for export. For example, the system 100 may add updated objects, or objects with relationships with updated objects to a queryIdsArg, that that the system 100 may use with a "WHERE" clause to select an object for export. In some implementations, the system may compare model or object version numbers to determine objects for export. For example, if the version number of an object (or even a class of objects) is higher in the source org than in the destination org, that object (or class of objects, respectively) would be selected for export.

In some implementations, the import order for updating a product or solution may be:

TABLE 2

A product or solution object import order (by class of object).

| Import Sequence | Class of Object |
|---|---|
| 2 | CatalogNode |
| 3 | CatalogNodeLocale |
| 3 | VirtualSku |
| 4 | CatalogNodeAttribute |

Figure 16:
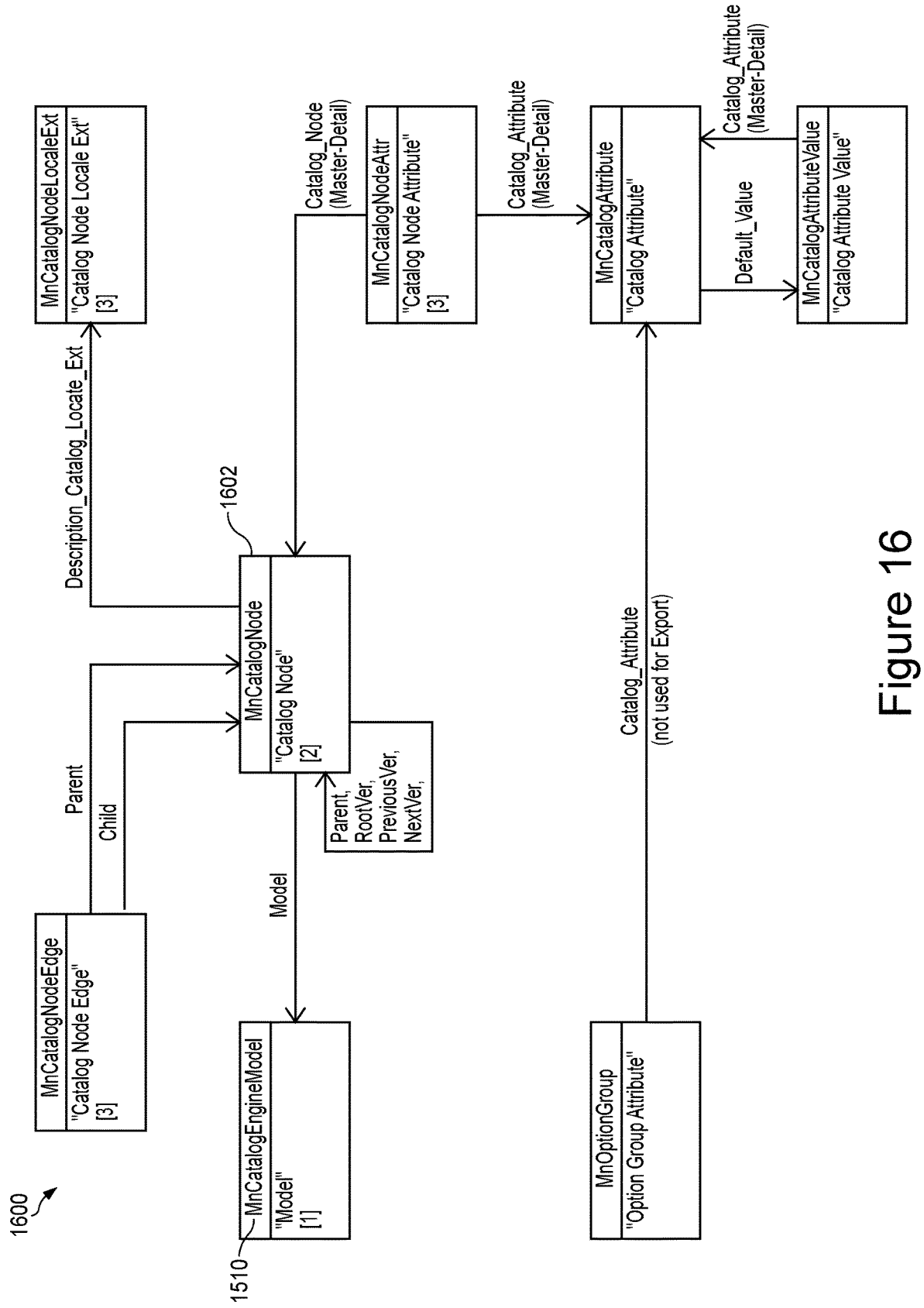
FIG. 16 is a class diagram of an example catalog node and related classes.

As an example, FIG. 16 describes the relationships of objects of these classes to one another. In some implementations, the system 100 may forgo transporting related master data Catalog Node Edge and Catalog Attribute object records with the Catalog Node product/solution, under the assumption that there will be a separate process for synchronizing Master Data across the orgs.

In some implementations, locking of certain objects or the entire org is necessary to prevent unpredictable or undesirable results. For example, in some implementations, the system 100 may lock the source org and destination org databases, meaning they would not be editable outside of the export, transport, import process, from the beginning of the process to the completion of the process.

In some implementations, the system 100 may use a finer locking procedure. For example, an object could be locked during export of that object, and then unlocked, resulting in a momentary lock that would be virtually invisible to a user. At the target org, the corresponding object could be locked only during the update of that object in the import process. Other variations between these two extremes (org databaselevel locking for the entire export/transport/import process, or object-level locking only during export and import) are contemplated.

The transport management performed by the system 100 (e.g., the model transporter 102) includes, in some implementations, setting up a transport job, monitoring the status of a transport job, and reviewing an executed transport job. A transport job record may include one or more fields describing one or more characteristics of the job, such as a name, comments, source org and/or destination org, transport type (e.g., income or outgoing), status, notification settings, etc. A data transport selected record, in some implementations, may have an ID, transport job ID, name, object ID and/or object external ID, etc. A data transport line record, in some implementations, has an ID, data transport job, object name, object ID and/or object external ID, status, etc. A data transport message, in some implementations, has a name, data transport job, data transport line, severity, message, details, etc. Values for the data transport status, in some implementations, include draft, ready (to transport), in transport, complete, failed.

A data transport object stores configuration metadata for a transported object. For example, a data transport object may have a label, name, a selectability flag, external ID, related object configuration fields, etc. In some implementations, related object configuration fields have a related object API name, related object field name, and current object field name.

In performing data transport validations, in some implementations, the system 100 may test the transport connection before marking the data transport job as ready for transport, verify that objects to be transported exist on the target org, and/or test for staleness among the objects to be transported (e.g., was the object modified after a "ready for transport" check?).

In some implementations, the system 100 may throw an error if it cannot invoke a web service call on the target, use the supplied credentials for the target org, if objects to be transported don't exist on the target org, and/or if related objects in a data transport line do not exist on the target org. In some implementations, the system 100 may throw a warning if certain parameters are mismatched, such as a version number of an important component of the target and source orgs.

In some implementations, a selective transport may focus on exporting a selected configuration model record and all of the related objects that support the model. For example, the objects of a given class may be imported and exported, grouped by class, in the order shown in the table below and may be selected using the corresponding "where" clause shown in the table below. In some implementations, the system orders objects by dependencies on other objects that were previously exported in a given order and may mirror the order of objects of a class with which they have a dependent relationship. In some implementations, the system 100 exports objects of a given class in an unordered set of objects of that class, but with objects still grouped by class in the class order shown in the table below. For object classes where no "where" clause is shown, the system may select all objects of that class for export/import. In some implementations, different "where" clauses may be used, and "where" clauses may be used where there are none in the example implementation shown. The @modelID is the ID of the model, and the @productIDs are products related to the model.

TABLE 3

Model object export (or import) order, by class, with export selectors for objects within a class.

| Import Sequence | Class of Object | Object Selection Clause |
|---|---|---|
| 1 | Model | Where Id = '@modelID' |
| 2 | CatalogNodeLocaleExt | |
| 3 | CatalogNode | Where Type in ('Category','Catalog') OR Id in (@productIDs) |
| 4 | CatalogNode | Where Type in ('Category','Catalog') OR Id in (@productIDs) |
| 5 | CatalogNodeEdge | Where (Child_r.Type in ('Category','Catalog') AND Parent_r.Type in ('Category', 'Catalog')) OR (Child_r.Id in (@productIDs)) |
| 6 | PriceList | |
| 7 | TieredPricing | |
| 8 | PriceListLine | Where Product_r.Id in (@productIDs) |
| 9 | Tier | |
| 10 | CatalogAttribute | |
| 11 | CatalogAttributeValue | |
| 12 | CatalogAttribute | |
| 13 | CatalogNodeAttr | Where Catalog_Node_r.Type in ('Category','Catalog') OR Catalog_Node_r.Id in (@productIDs) |
| 14 | PrintTemplate | |
| 15 | UILayout | Where Model_r.id = '@modelID' |
| 16 | UISection | Where Config_Engine_UI_Layout_r.model_r.id = '@modelID' |
| 17 | OptionGroup_c | Where Id in (Select r.OptionGroup_Id From ModelOptionGroupJunction r where Model_Id_r.Id = '@modelID') |
| 18 | Option | Where Option_Group in (Select r.OptionGroup_Id From ModelOptionGroupJunction r where Model_Id_r.Id = '@modelID') |
| 19 | OptionGroupAttribute-Junction | Where Option_Group_Id in (Select r.OptionGroup_Id From ModelOptionGroupJunction r where Model_Id_r.Id = '@modelID') |
| 20 | Rule | Where id in (Select r.Rule_Id From ModelRuleJunction r where Model_Id_r.Id = '@modelID') |
| 21 | Expression | |
| 22 | ExpressionCondition | |
| 23 | ExpressionRef | |
| 24 | RuleDataCell | Where rule in (Select r.Rule_Id From ModelRuleJunction r where Model_Id_r.Id = '@modelID') |
| 25 | ModelOptionGroupJunction | Where Model_Id_r.Id = '@modelID' |
| 26 | OGUISectionJunction | Where Option_Group_Id in (Select r.OptionGroup_Id From ModelOptionGroupJunction r where Model_Id_r.Id = '@modelID') |
| 27 | ModelRuleJunction | Where Model_Id_r.Id = '@modelID' |
| 28 | RuleOptionGroupJunction | Where rule in (Select r.Rule_Id From ModelRuleJunction r where Model_Id_r.Id = '@modelID') |
| 29 | ImportFormat | |
| 30 | QuoteRecordTypeFieldSetMapping | |
| 31 | ProductExclusion | |

In some implementations, excluding objects that have nothing to do with the configuration model and excluding product catalog information from the export can reduce the number of classes for export/import and yields the following, more manageable, set of classes.

TABLE 4

A paired down object export ordering, with selector clauses.

| Import Sequence | Class of Object | Object Selection Clause |
|---|---|---|
| 1 | Model | Where Id = '@modelID' |
| 15 | UILayout | Where Model__r.id = '@modelID' |
| 16 | UISection | Where Config__Engine__UI__Layout__r.model__r.id = '@modelID' |
| 17 | OptionGroup__c | Where Id in (Select r.OptionGroup__Id From ModelOptionGroupJunction r where Model__Id__r.Id = '@modelID') |
| 18 | Option | Where Option__Group in (Select r.OptionGroup__Id From ModelOptionGroupJunction r where Model__Id__r.Id = '@modelID') |
| 19 | OptionGroupAttribute-Junction | Where Option__Group__Id in (Select r.OptionGroup__Id From ModelOptionGroupJunction r where Model__Id__r.Id = '@modelID') |
| 20 | Rule | Where id in (Select r.Rule__Id From ModelRuleJunction r where Model__Id__r.Id = '@modelID') |
| 21 | Expression | |
| 22 | ExpressionCondition | |
| 23 | ExpressionRef | |
| 24 | RuleDataCell | Where rule in (Select r.Rule__Id From ModelRuleJunction r where Model__Id__r.Id = '@modelID') |
| 25 | ModelOptionGroupJunction | Where Model__Id__r.Id = '@modelID' |
| 26 | OGUISectionJunction | Where Option__Group__Id in (Select r.OptionGroup__Id From ModelOptionGroupJunction r where Model__Id__r.Id = '@modelID') |
| 27 | ModelRuleJunction | Where Model__Id__r.Id = '@modelID' |
| 28 | RuleOptionGroupJunction | Where rule in (Select r.Rule__Id From ModelRuleJunction r where Model__Id__r.Id = '@modelID') |

As an example, FIG. 15 describes the relationships between objects of these classes where they are grouped by the import sequence number, above.

In some implementations, the system 100 may export fields fulfilling the following criteria:

In some implementations, the import order for updating a model may be:

TABLE 5

Another model object import order (by class of object).

| Import Sequence | Class of Object | Group Number | Class Number |
|---|---|---|---|
| 1 | Model | 1502 | 1510 |
| 1 | OptionGroup | 1502 | 1512 |
| 1 | Rule | 1502 | 1514 |
| 1 | RuleOptionGroupJunction | 1502 | 1516 |
| 1 | RuleDataCell | 1504 | 1518 |
| 1 | Expression | 1504 | 1520 |
| 1 | ExpressionCondition | 1504 | 1522 |
| 1 | ExpressionRef | 1504 | 1524 |
| 2 | OptionGroupAttributeJunction | 1506 | 1526 |
| 2 | Option | 1506 | 1528 |
| 2 | ModelOptionGroupJunction | 1506 | 1530 |
| 2 | ModelRuleJunction | 1506 | 1532 |
| 2 | UILayout | 1508 | 1534 |
| 3 | UISection | 1508 | 1536 |
| 4 | OptionGroupUISectionJunction | 1508 | 1538 |

(dField.isNameField( ) && !dField.isAutoNumber( ))||(dField.isCustom( ) && dField.isUpdateable( ))||(dField.isCustom( ) && dField.getType( )==Schema.DisplayType.Reference).

For lookup fields, in some implementations, the system 100 may set the value of the external ID of the related record. The external ID field may be set as part of the custom metadata.

In some implementations, the system 100 exports a record for each object type in its own file and writes the file to the user's private library with a file name such as EXP_<namespace>_<ObjectName>_<three digit file number>.json. In some implementations, the file may be a JSON file which contains a list of base64 encoded blob of Map<String, Object>. Other file formats would be suitable, as well (e.g., non-encoded JSON, XML, binary, etc.).

FIG. 1 is a block diagram of an example system 100 for model transport using a model transporter 102 connected to a network 104. Also connected to the network 106 are data repository 1 120 and data repository 2 150. In some embodiments, data repository 1 120 and data repository 2 150 may also have a direct connection 190 in addition to the connection to the network 104. In some embodiments, data repository 1 120 and data repository 2 150 may be the same data repository.

In the implementation shown, data repository 1 120 is used to store a current data model 122—a data model where the objects are up-to-date. The current data model 122 has components such as a model object 123, and model component 1 124a through model component n 124n. It is to be understood that model component n 124n represents that there are a variable number of model components.

The model components 124a-124n (collectively referred to as 124) may comprise various types of data objects or classes. A class is a data structure that may also include behavior in the form of member functions that are associated with the object type (class). Example object types include model, rule, option group, rule data cell, expression, expression condition, expression reference, option group attribute, option, user interface ("UI") layout and UI section.

In some implementations, a set of a model components may also comprise junction objects that relate two or more objects of the types mentioned (or other, similar, object types). An object type is also referred to as an object class—or simply as a "class."

As shown, junction objects junction 1 126a, junction 2 126b, and junction n 126n represent a variable number of junction objects which relate two other objects to one another. In particular, junction 1 126a has a relationship 128 with model object 123 and a relationship 130 with model component 1 124a. Thus junction 1 126a indirectly relates model object 123 and model component 1 124a, and they may conveniently interact with each other, as needed. Examples of objects of this type may be found in FIG. 15 as the model-OG junction 1530 and the model-rule junction 1532.

Junction 2 has a relationship 132 with model component 1 124a and a relationship 134 with model component 2 124b. The other junction objects of FIG. 15 are examples of these types of junction object, such as the rule-OG junction 1516 or OG-UIsection junction 1538

Data repository 2 150 is used to store a copy, which in this implementation is out-of-date, of the current data model 122. This non-current copy of data model 122 is denoted as the non-current data model 152. The non-current data model 152 has components such as the model object 153 and model component 1 154a through model component n 154n. The components roughly correspond to the model components 124a-124n of the current data model 122. Since the non-current data model 152 is out of date, some of the model components 154a-154n may be out of date. For example, some of the model components 154a-154n may have been deleted from the current data model 122. Some of the model components 124a-124n in the current model may have been created since the non-current data model 152 was last updated and may therefore not exist among the model components 154a-154n in the non-current data model.

The model components 154a-154n (collectively referred to as 154) may comprise the same types of data objects as those in the current model. Likewise, junction objects junction 1 156a, junction 2 156b, and junction n 156n represent the same type of junction objects as 126a-126n.

The network 104 may include any number of networks and/or network types. For example, the network 104 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The user device 180 comprises any time of device used to access the system directly, or through the network 104. The user may be an administrator or other user who has access to the transport functionality. There may be more than one user device 180 or even multiple users with multiple user devices 180.

The model transporter 102 may have an API 140 that allows for connected app a 142a to interface with the model transporter to provide additional functionality (e.g., an authentication module). There may be any number of connected apps, as illustrated by connected app n 142n.

It should be understood that the system 100 illustrated in FIG. 1 is representative of an example system and that a variety of different system environments and configurations are contemplated and are within the scope of the present disclosure. For instance, various entities of the system may be integrated into a single computing device or system or additional computing devices or systems, etc.

Figure 2:
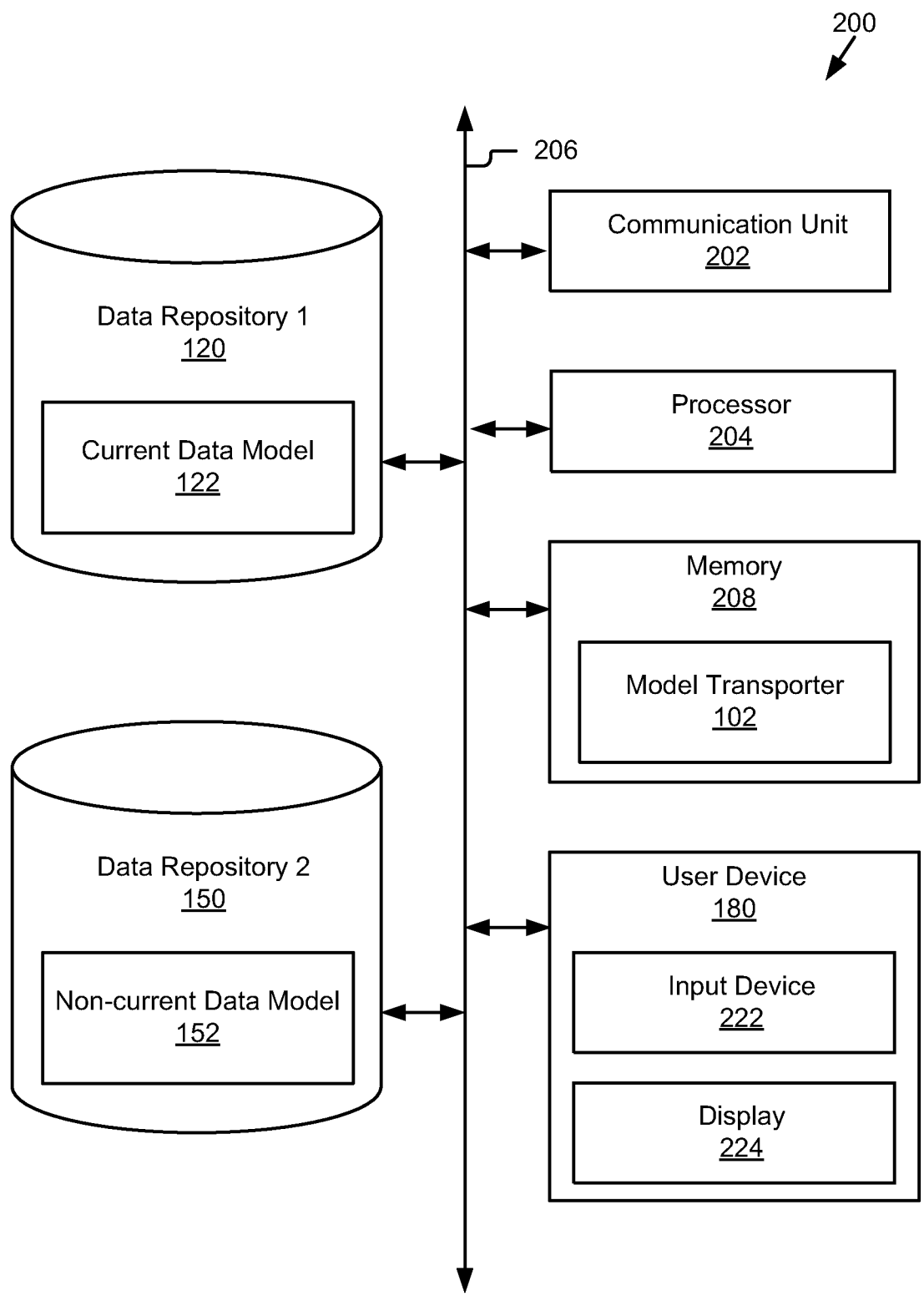
FIG. 2 is a block diagram illustrating an example computing system for model transport.

FIG. 2 is a block diagram of an example computing system 200. As depicted, the computing system 200 may include a processor 204, a memory 208, a communication unit 202, a data store 208, a user device 180 (including an input device 222, and a display 224), which may be communicatively coupled by a communication bus 206. It is to be understood that the system 200 may have more than one of the preceding components. The computing system 200 depicted in FIG. 2 is provided by way of example, and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations.

The processor 204 may execute software instructions by performing various input, logical, and/or mathematical operations. The processor 204 may have various computing architectures to process data signals including, for example, a complex instruction set computer (CISC) architecture, a reduced instruction set computer (RISC) architecture, and/or an architecture implementing a combination of instruction sets. The processor 204 may be physical and/or virtual and may include a single core or plurality of processing units and/or cores. In some implementations, the processor 204 may be capable of generating and providing electronic display signals to a display device, supporting the display of images, capturing and transmitting images, performing complex tasks including various types of feature extraction and sampling, etc. In some implementations, the processor 204 may be coupled to the memory 208 via the bus 206 to access data and instructions therefrom and store data therein. The bus 206 may couple the processor 204 to the other components of the system 200 including, for example, the memory 208, the communication unit 202, the user device 108, and the data store 208.

The memory 208 may store and provide access to data to the other components of the computing system 200. The memory 208 may be included in a single computing device or a plurality of computing devices. In some implementations, the memory 208 may store instructions and/or data that may be executed by the processor 204. For example, as depicted in FIG. 2, the memory 208 may store the Model Transporter and its respective components, depending on the configuration. The memory 208 is also capable of storing other instructions and data, including, for example, an operating system, hardware drivers, other software applications, databases, etc. The memory 208 may be coupled to the bus 206 for communication with the processor 204 and the other components of computing system 200.

The memory 208 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 204. In some implementations, the memory 208 may include one or more of volatile memory and non-volatile memory. For example, the memory 208 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 208 may be a single device or may include multiple types of devices and configurations.

The bus 206 can include a communication bus for transferring data between components of a computing device or between computing devices, a network bus system including the network 104 or portions thereof, a processor mesh, a combination thereof, etc. In some implementations, the model transporter 102, and various other components of the system 200 (operating systems, device drivers, etc.) may cooperate and communicate via a communication mechanism included in or implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity with the network 104 and the other components of the system 200, for example, the user device 108, the processor 204, etc. For instance, the communication unit 202 may include, but is not limited to, CAT-type interfaces; wireless transceivers for sending and receiving signals using Wi-Fi™; Bluetooth®, IrDA™, Z-Wave™, ZigBee®, cellular communications, etc.; USB interfaces; various combinations thereof; etc. The communication unit 202 may include radio transceivers (e.g., 5G+, 4G, 3G, 2G, etc.) for communication with the network 104, and radio transceivers for Wi-Fi™ and close-proximity/personal area (e.g., Bluetooth®, NFC, etc.) connectivity, geo-location transceivers (e.g., GPS) for receiving and providing location information for the corresponding device, and the like. The communication unit 202 may be coupled to the other components of the computing system 200 via the bus 206. The communication unit 202 may be coupled to the network 104 as illustrated by the signal line 210. In some implementations, the communication unit 202 can link the processor 204 to the network 104, which may, in turn, be coupled to other processing systems. The communication unit 202 can provide other connections to the network 104 and to other entities of the system 100 using various communication protocols, including, for example, those discussed elsewhere herein.

The data repositories 120 and 150 may be included in the computing system 200 or in another computing system and/or storage system distinct from but coupled to or accessible by the computing system 200. The repositories 120 and 150 can include one or more non-transitory computer-readable mediums for storing the data. In some implementations, the repositories 120 and 150 be incorporated with the memory 208 or may be distinct therefrom. In some implementations, the repositories 120 and 150 may store data associated with a database management system (DBMS) operable on the computing system 200. For example, the DBMS could include a structured query language (SQL) DBMS, a NoSQL DBMS, various combinations thereof, etc. In some instances, the DBMS may store data in multi-dimensional tables comprised of rows and columns, and manipulate, i.e., insert, query, update and/or delete, rows of data using programmatic operations. In some implementations, the repositories 120 and 150 may one physical or logical data repository. In some implementations, the repositories 120 and 150 may separate physical or logical data repositories.

The input device 222 may include any device for inputting information into the computing system 200. In some implementations, the input device 222 may include one or more peripheral devices. For example, the input device 222 may include a keyboard (e.g., a QWERTY keyboard), a pointing device (e.g., a mouse or touchpad), microphone, an image/video capture device (e.g., camera), etc. In some implementations, the structure and/or functionality of one or more of the input device 222 and the display 224 may be integrated, and a user of the computing system 200 may interact with the computing system 200 by contacting a surface of the display 224 using one or more fingers. In this example, the user could interact with an emulated (i.e., virtual or soft) keyboard displayed on the touch-screen display 224 by using fingers to contact the display in the keyboard regions.

The display 224 may display electronic images and data output by the computing system 200 for presentation to a user. The display 224 may include any conventional display device, monitor or screen, including, for example, an organic light-emitting diode (OLED) display, a liquid crystal display (LCD), etc. In some implementations, the display 224 may be a touch-screen display capable of receiving input from one or more fingers of a user. In some implementations, the computing system 200 may include a graphics adapter (not shown) for rendering and outputting the images and data for presentation on display 224. The graphics adapter (not shown) may be a separate processing device including a separate processor and memory (not shown) or may be integrated with the processor 204 and memory 208.

As depicted in FIG. 2, the computing system 200 may include a model transporter 102. The model transporter 102 may be communicatively coupled by the bus 206 and/or the processor 204 to the other components of the computing system 200. In some implementations, the model transporter 102 includes computer logic executable by the processor 204 to provide the functionality discussed hereafter. In any of the preceding implementations, model transporter 102 may be adapted for cooperation and communication with the processor 204 and other components of the computing system 200. The model transporter 102 is coupled to the data store 208 to store, retrieve, and/or manipulate data stored therein.

Figure 3:
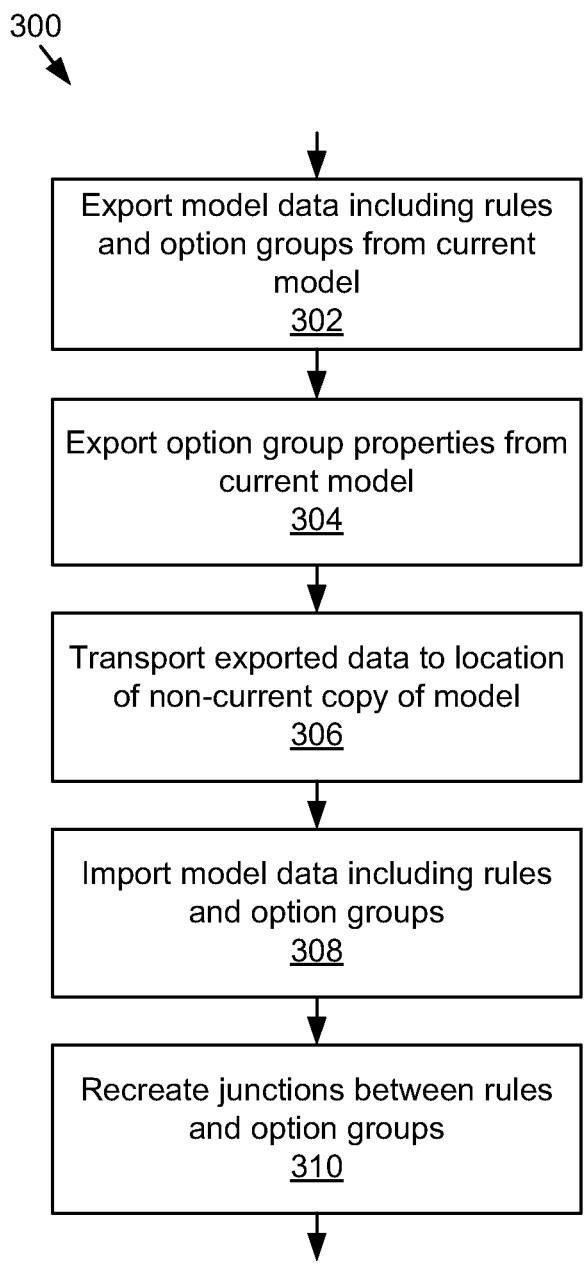
FIG. 3 is a flowchart of an example method for transporting a model.

FIG. 3 is a flowchart of an example method 300 of the model transporter 102. In some implementations, a model will be created in one repository and, as some point, copied to another repository, for a variety of reasons, including network accessibility. At some point, the copies diverge through modification to one, without modification to the other. In some implementations, one copy may be the primary version, and other copies may be secondary. In some implementations, the various copies may be peers. Other combinations of primacy are contemplated, including multiple primary copies and various hierarchies of primacy among the extant copies.

In some implementations, with a current version of the model, current data model 122, and a, non-current version, non-current data model 152, the model transporter 102 performs method 300. Method 300 exports, from the current data model, model data 302 (the model object as model object file), option group ("OG") objects as an OG object file, rule objects as a rule object file, and rule-to-OG junction objects in a rule-to-OG junction object file. In some implementations, in this operation and subsequently-explained operations in this and following figures, the export objects may be grouped differently in files or may be grouped and exported in objects other than files. Likewise, the order of export may vary, and the grouping of objects in datasets may vary. Likewise, the selection of objects exported may vary by date, version, or another criterion or set of criteria. For example, objects modified later than the version number or date of the last copy or update may be selected for export.

In block 304, the method 300 exports a second data set including OG property objects in an OG property object file and OG-to-OG-property junction objects in an OG-to-OG-property junction object file. Other operations, not illustrated my export other object types in other object files. For example, in some implementations, an operation may export model-to-OG junction objects in a model-to-OG junction object file and model-to-rule objects in a model-to-rule object file.

In block 306, the method 300 transports all or some of the exported data to a location convenient to the non-current data model 152. In some embodiments, the location may be a different data repository such as data repository 2 150, or some other local or remote data repository. In some embodiments, the files may reside in the same data repository. In some implementations, the transport operation may not be necessary, because the exported files are available to both the current data model 122 and the non-current data model 152.

In block 308, the method 300 imports the all or some of the exported data files, including some combination of the model data, OGs, rules, OG properties, and various junction objects. The selection of objects imported may vary by date, version, or another criterion or set of criteria. For example, objects modified later than the version number or date of the last copy or update may be selected for export. Likewise, the import order of the selected objects may vary according to different criteria.

In block 310, the method 300 recreates junctions objects which form a junction between rules and option groups. In some implementations, other junction objects may be recreated.

Figure 4:
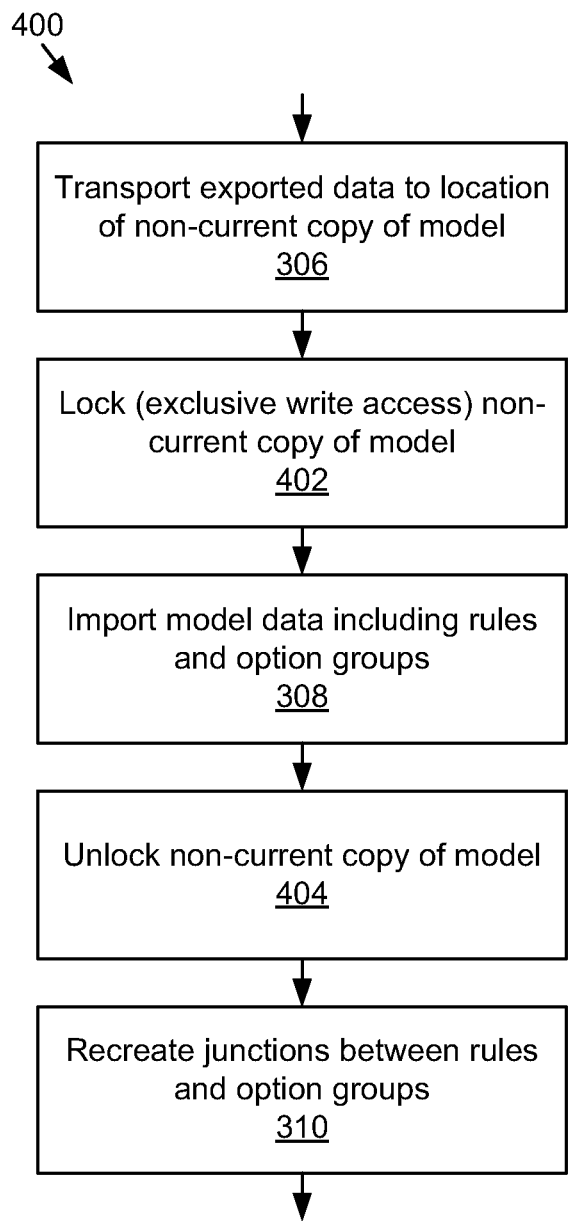
FIG. 4 is a flowchart of part of an example method for transporting a model with locking.

FIG. 4 is a flowchart of a method 400 of the model transporter 102. In some implementations, the operations illustrated may be part of a larger method. For example, in some implementations, method 400 may begin with the transport operation 306 of method 300 and then, as shown in block 402, perform an operation to lock (for exclusive write access) the non-current copy of the data model 152 prior to importing 308 the transported data files of operation 306.

Responsive to the import operation shown in block 308, the method 400 performs an unlock operation on the non-current data model 152 in block 404. Either before or after the unlock operation 404, the method 400 can continue with the junction recreation operation in block 310.

Figure 5:
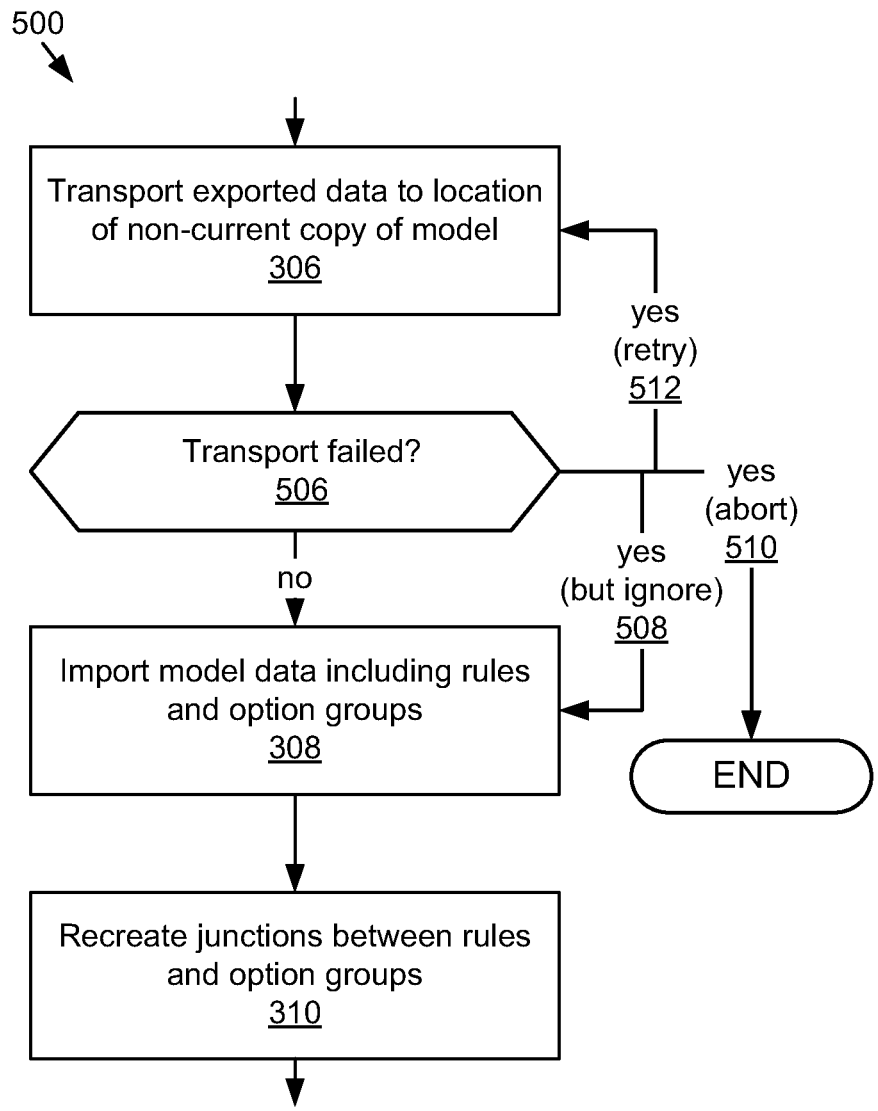
FIG. 5 is a flowchart of part of an example method for transporting a model with transport failure detection and retry.

FIG. 5 is a flowchart of an example method 500 of the model transporter 102. In some implementations, the operations illustrated may be part of a larger method, for example, in some implementations, method 500 may begin with the transport operation of method 300, as shown in block 306, and then perform a checking operation to query whether the object transport failed, as shown in block 506. In some implementations, if the transport failed, the method may ignore the failure, as shown in path 508 and continue importing the data that successfully transported, as shown in block 308. In some implementations, if the transport failed, the method may abort the transport operation, as shown in path 510, stop processing the method, perhaps throwing or logging an error. In some implementations, if the transport failed, the method may retry the transport, as shown in path 512, and then continue on when all files have transported.

FIG. 6 is a graphical user interface of an example authorization provider detail page 600 GUI which contains information used to configure a connected app and named credentials for use in allowing the source org to communicate with the target org for the data transport. Each authorization provider has an identifier 602 that uniquely identifies it within the system. In some implementations, fields include a provider type, name, consumer key, consumer secret 604, authorization URL(s), callback URL 606, and other parameters which may be helpful. In some implementations, the consumer secret 604 may be displayed in a manner which hides its value from casual observance.

FIG. 7 is a graphical user interface of an example administrator page 700 GUI showing the products section 702 selected, displaying products that are available for transport 704 (among other things). Various properties of the products are displayed in the table that forms the body of the page, and various actions, including transport 704 may be taken on the listed products. Solutions 706 could also be selected and displayed for transport.

Figure 8:
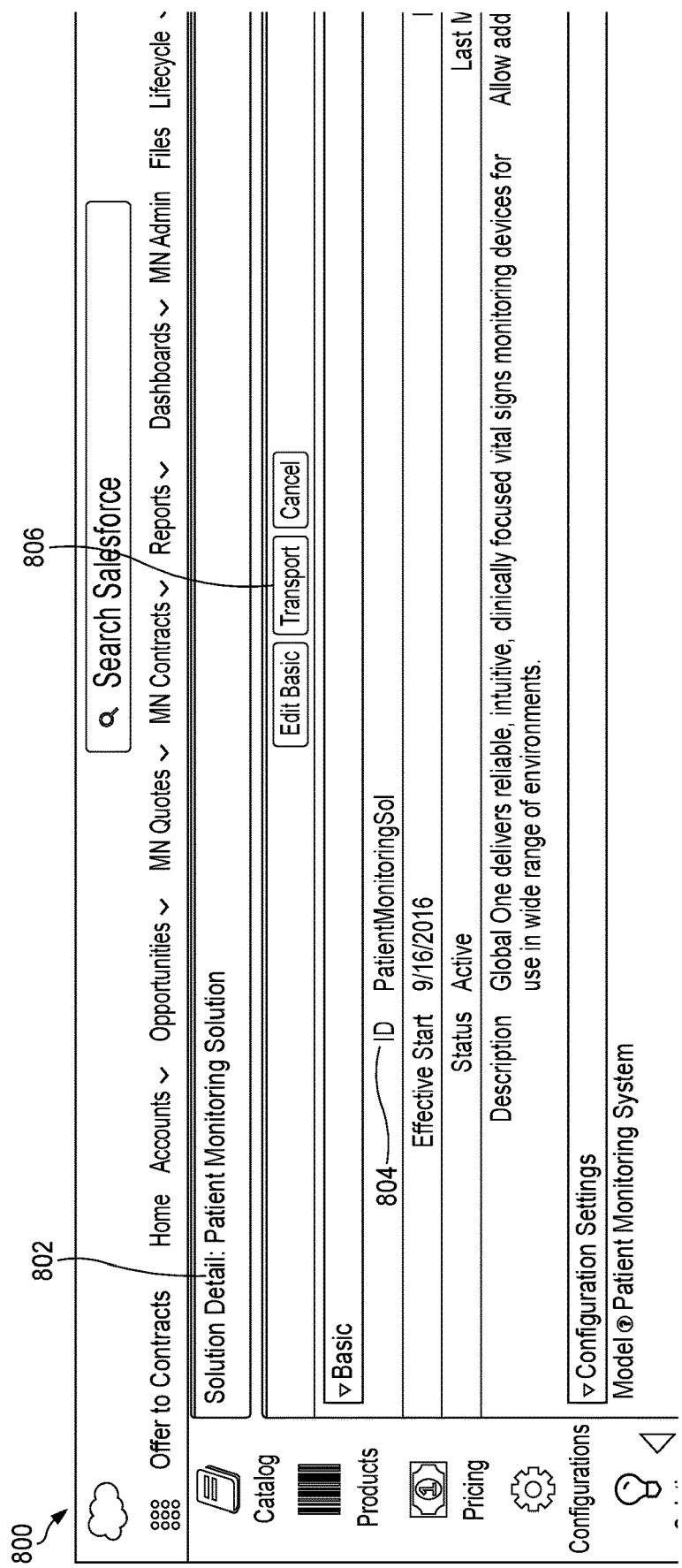
FIG. 8 is a graphical representation of an example administrator page GUI for solution details.

FIG. 8 is a graphical user interface of an example administrator page 800 GUI showing details of a solution 802, including details such as the solution ID 804 and other detail. The solution may be selected for transport by selecting the transport button 806. Details for products are displayed in a similar screen in some implementations.

Figure 9:
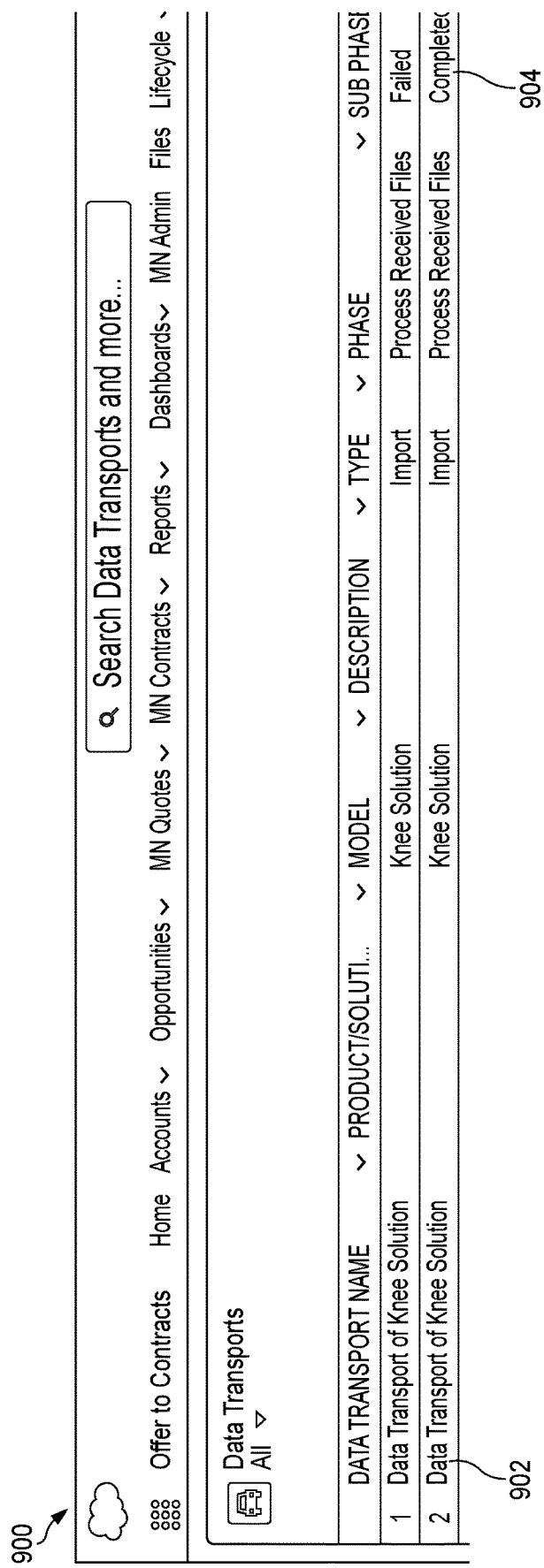
FIG. 9 is a graphical representation of an example data transport job listing page GUI.

FIG. 9 is a graphical user interface of an example data transport listing page 900 GUI showing transport jobs 902 for products, solutions, and/or models for transport, along with their progress or status 904.

Figure 10:
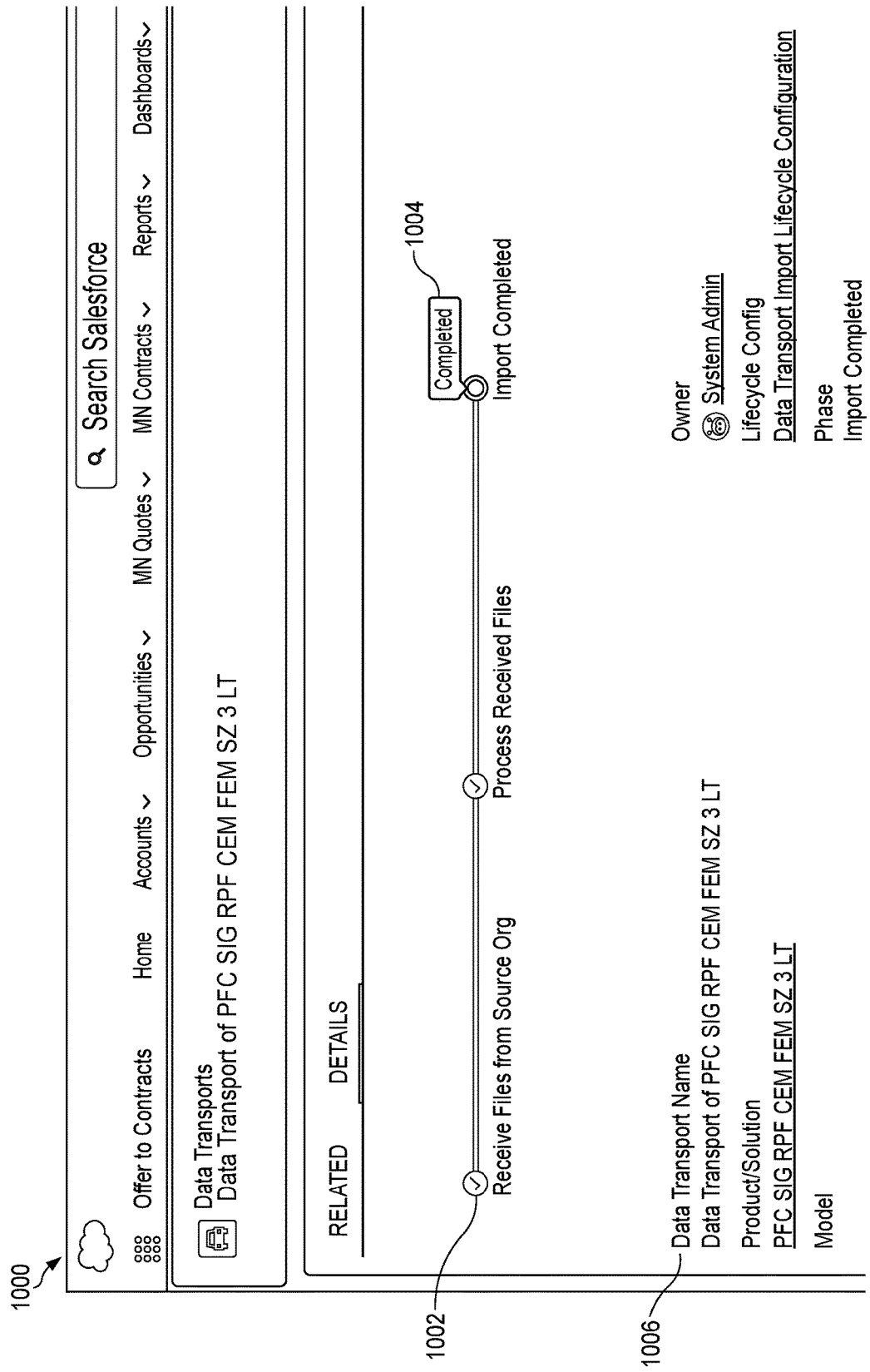
FIG. 10 is a graphical representation of an example data transport job details page GUI.

FIG. 10 is a graphical user interface of an example data transport details page 1000 GUI showing the details of a data transport job for a product, solution, or model. The page 1000 contains a progress bar 1002 showing the progress of the transport through the stages of transport and the status of the transport 1004. In some implementations, the page shows other relevant details 1006 regarding the transport job or the data being transported by the transport job.

FIG. 11 is a graphical user interface of an example data transport related items page 1000 GUI showing files 1102 attached to the transport job and listing errors and other log messages 1104 from the transport job.

FIG. 12 is a graphical user interface of an example data transport file listing page 1200 GUI showing the files associated with a data transport job. In some implementations, clicking on a file name 1202 allows the user to observe the contents of the data file. In some implementations, the status of the transfer of each file, or other relevant information relating to the file and the data transfer job may be shown.

FIG. 13 is a graphical user interface of an example data transport job log message page 1300 GUI showing errors 1302 and other log messages 1304 from the data transport. In some implementations, various data related to each message may also be shown in the listing, including a message ID, date, time, type, and text of the message.

Figure 14:
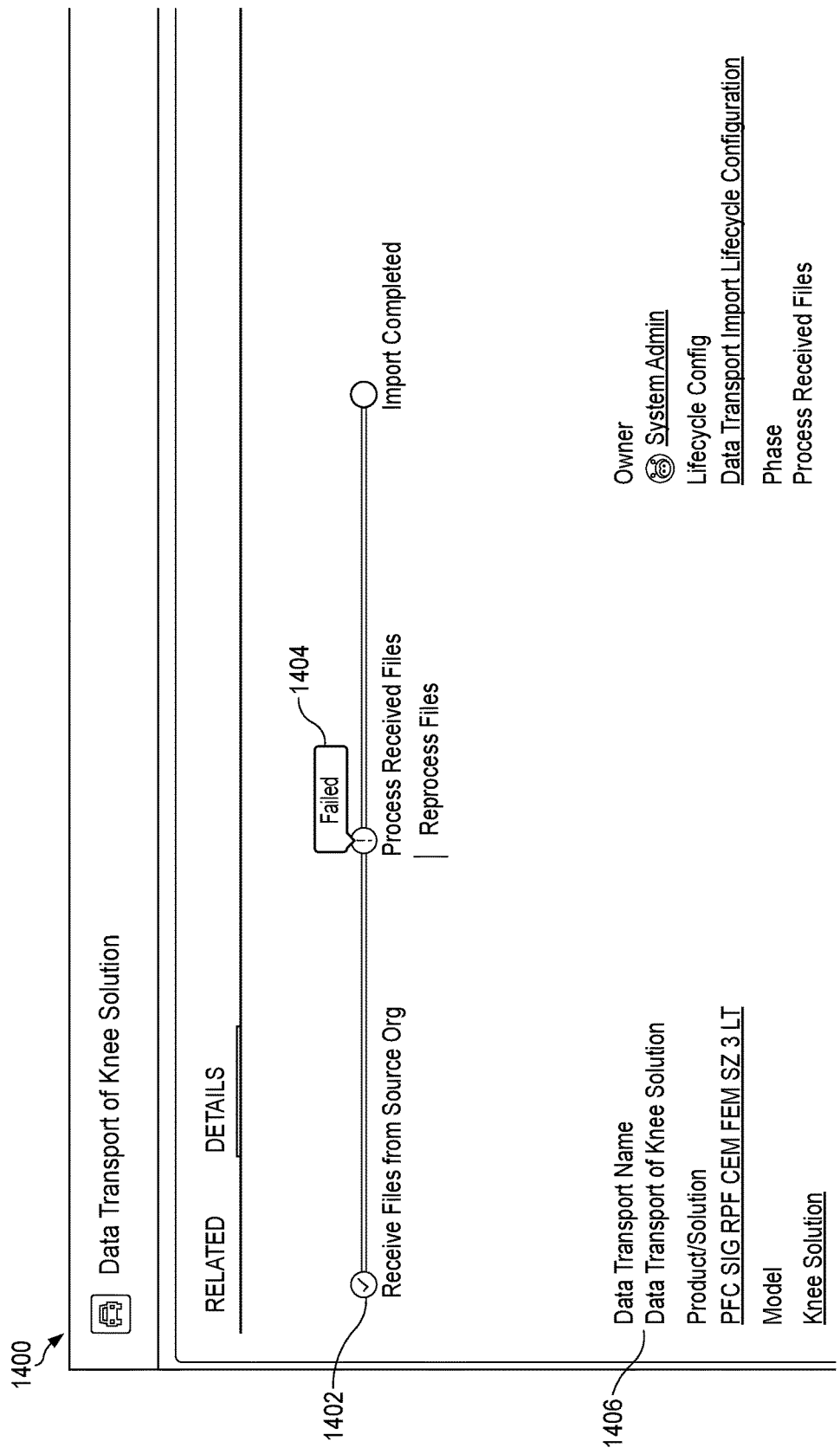
FIG. 14 is a graphical representation of an example data transport details page GUI.

FIG. 14 is a graphical user interface of an example data transport details page 1400 GUI showing the details of a data transport job for a product, solution, or model. The page 1400 contains a progress bar 1402 showing the progress of the transport through the stages of transport and the status of the transport 1404 (failed, in this illustration). In some implementations, the page shows other relevant details 1406 regarding the transport job or the data being transported by the transport job.

FIG. 15 is a class diagram 1500 for a model 1510 and its related classes. The main related classes are the option group 1512 and the rule 1514. Additionally, in this example, other classes are shown including UI classes, and classes related to option group 1512 and rule 1514. Items in the figure are grouped, roughly by related items and by an import order that can efficiently address object dependencies during the import. The model group 1502 contains the first four classes to be imported at the destination model, the model itself, objects of the class option group ("OG") 1512, objects of the class rule 1514, and objects of the class Rule-to-OG junction 1516 which connects an object of type rule to an object of type OG. The rule detail group 1504 contains classes that contain details of the rule 1514: rule data cell 1518, expression 1520, expression condition 1522, and expression reference 1524. The junction group 1506 contains the OG-attribute junction 1526, which connects an option group object to an attribute in the catalog (which, in some implementations, is outside of the collection of object classes which make up the model, itself), the option 1528, the model-to-OG junction 1530, and model-to-rule junction 1532. The UI group contains the UI layout 1534, UI section 1536, and the OG-to-UI section 1538 classes.

FIG. 16 is a class diagram 1600 for a catalog node 1602 and related classes for a product or solution. The catalog node is related to the model 1510 from FIG. 15.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities comprise electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can comprise an entirely hardware implementation, an entirely software implementation, or implementations containing both hardware and software elements. For instance, the technology may be implemented in software, which includes but is not limited to firmware, resident software, microcode, etc. Furthermore, the technology can comprise a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code should be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. Also, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the preceding. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method, comprising:
    exporting a first data set comprising a model framework of a current data model, the first data set including a set of first object files comprising:
        a model object file having a model object for the current data model;
        an option group ("OG") object file having one or more OG objects;
        a rule object file having one or more rule objects; and
        a rule-to-OG junction object file having one or more rule-to-OG junction objects that relate the one or more rule objects to the one or more OG objects;
    exporting, from the current data model, a second data set, the second data set including a set of second object files comprising:
        a model-to-OG junction object file having one or more model-to-OG junction objects; and
        a model-to-rule junction object file having one or more model-to-rule junction objects;
    transporting the first data set and the second data set from a second data repository to a first data repository;
    importing, to a non-current data model, the first data set to update the model object, the one or more OG objects, the one or more rule objects, and the one or more rule-to-OG junction objects; and
    importing, to the non-current data model, the second data set to re-create, in the non-current data model, the one or more model-to-OG junction objects relating the one or more OG objects to the model object and the one or more model-to-rule junction objects relating the one or more rule objects to the model object.

2. The computer-implemented method of claim 1, further comprising:
    locking the non-current data model for exclusive write access, before the importing of the first data set and the importing of the second data set; and
    unlocking the non-current data model after the importing of the first data set and the importing of the second data set is completed.

3. The computer-implemented method of claim 1, wherein importing the first data set, including the set of first object files, occurs prior to importing the second data set, including the set of second object files.

4. The computer-implemented method of claim 1, further comprising:
    exporting, from the current data model, a third data set, the third data set including a set of third object files comprising:
        an OG property object file having one or more OG property objects; and
        an OG-to-OG-property junction object file having one or more OG-to-OG-property junction objects that relate an OG to an OG-property.

5. The computer-implemented method of claim 4, wherein the one or more OG property objects comprise one or more of OG option objects and OG attribute objects.

6. The computer-implemented method of claim 1, further comprising:
    detecting a component which failed to transport; and
    retrying the transport of the component which failed to transport.

7. The computer-implemented method of claim 1 further comprising:
    exporting, to the second data repository, before transporting the first data set and the second data set is complete, a fourth data set including a set of fourth object files comprising:
        an expression object file having one or more expression objects;
        an expression condition object file having one or more expression condition objects;
        an expression reference object file having one or more expression reference objects; and
        a rule data cell object file having one or more rule data cell objects;

transporting the fourth data set from the second data repository to the first data repository; and
importing the fourth data set into the non-current data model.

8. A system comprising:
one or more processors;
one or more data stores, wherein the one or more data stores are communicatively coupled to the one or more processors, the one or more data stores configured to store instructions, which when executed by the one or more processors include:
   exporting a first data set comprising a model framework of a current data model, the first data set including a set of first object files comprising:
      a model object file having a model object for the current data model;
      an option group ("OG") object file having one or more OG objects;
      a rule object file having one or more rule objects; and
      a rule-to-OG junction object file having one or more rule-to-OG junction objects that relate the one or more rule objects to the one or more OG objects;
   exporting, from the current data model, a second data set, the second data set including a set of second object files comprising:
      a model-to-OG junction object file having one or more model-to-OG junction objects; and
      a model-to-rule junction object file having one or more model-to-rule junction objects;
   transporting the first data set and the second data set from a second data repository to a first data repository;
   importing, to a non-current data model, the first data set to update the model object, the one or more OG objects, the one or more rule objects, and the one or more rule-to-OG junction objects to match;
   importing, to the non-current data model, the second data set to update the model object, the one or more OG objects, the one or more rule objects, and the one or more rule-to-OG junction objects; and
   re-creating, in the non-current data model, the one or more model-to-OG junction objects and the one or more model-to-rule junction objects.

9. The system of claim 8, further comprising:
locking the non-current data model for exclusive write access, before the importing of the first data set and the importing of the second data set; and
unlocking the non-current data model after the importing of the first data set and the importing of the second data set is completed.

10. The system of claim 8, wherein importing the first data set, including the set of first object files, occurs prior to importing the second data set, including the set of second object files.

11. The system of claim 8 further comprising:
exporting, from the current data model, a third data set, the third data set including a set of third object files comprising:
   an OG property object file having one or more OG property objects; and
   an OG-to-OG-property junction object file having one or more OG-to-OG-property junction objects that relate an OG to an OG-property.

12. The system of claim 11 wherein the one or more OG property objects comprise one or more of OG option objects and OG attribute objects.

13. The system of claim 8, further comprising:
detecting a component which failed to transport; and
retrying the transport of the component which failed to transport.

14. The system of claim 8, the instructions further comprising:
   exporting, to the second data repository, before the transporting the first data set and the second data set is complete, a fourth data set including a set of fourth object files comprising:
      an expression object file having one or more expression objects;
      an expression condition object file having one or more expression condition objects;
      an expression reference object file having one or more expression reference objects; and
      a rule data cell object file having one or more rule data cell objects;
   transporting the fourth data set from the second data repository to the first data repository; and
   importing the fourth data set into the non-current data model.

15. A system, comprising:
means for exporting a first data set comprising a model framework of a current data model, the first data set including a set of first object files comprising:
   a model object file having a model object for the current data model;
   an option group ("OG") object file having one or more OG objects;
   a rule object file having one or more rule objects; and
   a rule-to-OG junction object file having one or more rule-to-OG junction objects that relate a rule to an OG;
means for exporting, from the current data model, a second data set, the second data set including a set of second object files comprising:
   a model-to-OG junction object file having one or more model-to-OG junction objects; and
   a model-to-rule junction object file having one or more model-to-rule junction objects;
means for transporting the first data set, and the second data set from a second data repository to a first data repository;
means for importing, to a non-current data model, the first data set to update the model object, the one or more OG objects, the one or more rule objects, and the one or more rule-to-OG junction objects;
means for importing, to the non-current data model, the second data set to update the one or more model-to-OG junction objects, and the one or more model-to-rule junction objects to match; and
means for re-creating, in the non-current data model, the one or more model-to-OG junction objects relating the one or more OG objects to the model object and the one or more model-to-rule junction objects relating the one or more rule objects to the model object.

16. The system of claim 15, further comprising:
means for locking the non-current data model for exclusive write access, before the importing of the first data set and the importing of the second data set; and
means for unlocking the non-current data model after the importing of the first data set and the importing of the second data set is completed.

17. The system of claim 15, wherein importing the first data set, including the set of first object files, occurs prior to importing the second data set, including the set of second object files.

18. The system of claim 15 further comprising:
means for exporting, from the current data model, a third data set, the third data set including a set of third object files comprising:
- an OG property object file having one or more OG property objects; and
- an OG-to-OG-property junction object file having one or more OG-to-OG-property junction objects that relate an OG to an OG-property.

19. The system of claim 15, further comprising:
means for detecting a component which failed to transport; and
means for retrying the transport of the component which failed to transport.

20. The system of claim 15 further comprising:
means for exporting, to the second data repository, before the transporting the first data set and the second data set is complete, a fourth data set including a set of fourth object files comprising:
- an expression object file having one or more expression objects;
- an expression condition object file having one or more expression condition objects;
- an expression reference object file having one or more expression reference objects; and
- a rule data cell object file having one or more rule data cell objects;

means for transporting the fourth data set from the second data repository to the first data repository; and
means for importing the fourth data set into the non-current data model.

\* \* \* \* \*